Oct. 2, 1951     A. H. REDDING     2,570,155
FLOW APPARATUS
Filed Feb. 25, 1948     2 Sheets-Sheet 1
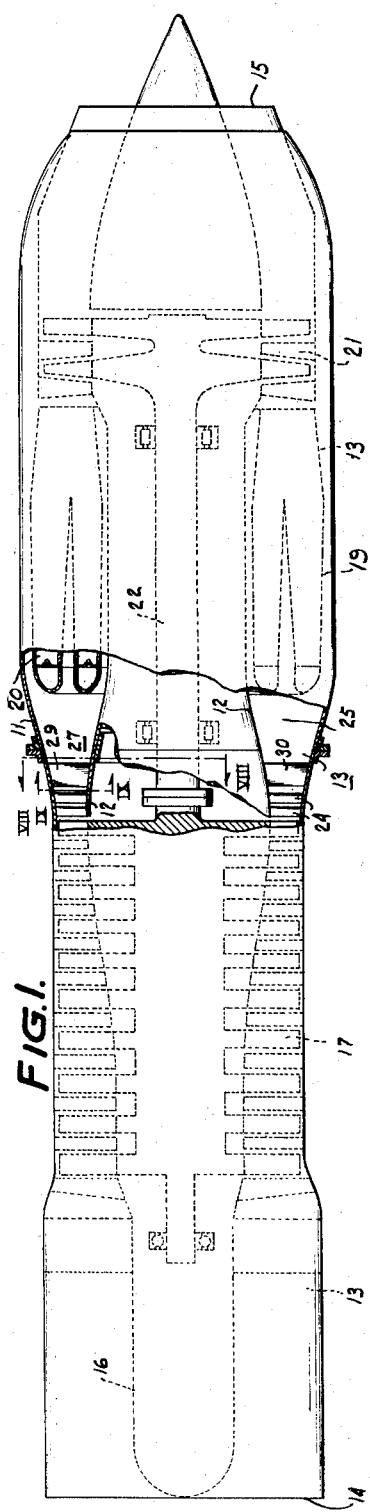
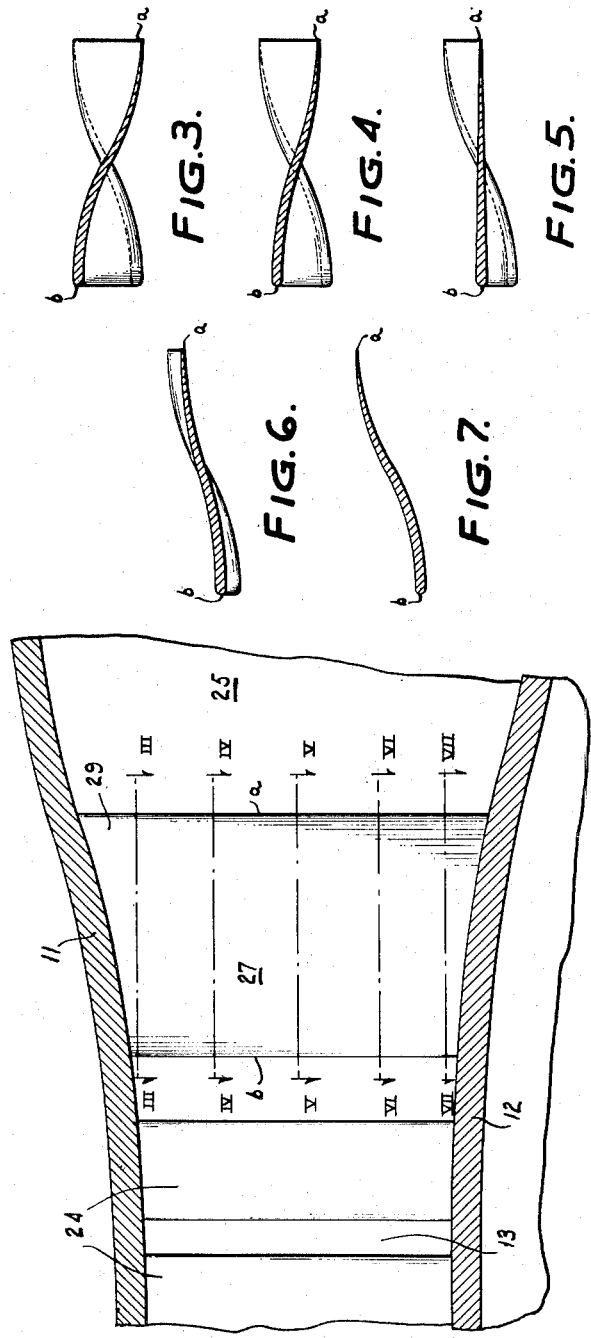
INVENTOR
ARNOLD H. REDDING
BY
ATTORNEY Oct. 2, 1951     A. H. REDDING     2,570,155
FLOW APPARATUS Filed Feb. 25, 1948     2 Sheets-Sheet 2

WITNESSES:
John M. Wright
V. W. Novak

INVENTOR
ARNOLD H. REDDING
BY
ATTORNEY

Patented Oct. 2, 1951

2,570,155

UNITED STATES PATENT OFFICE 2,570,155

FLOW APPARATUS

Arnold H. Redding, Swarthmore, Pa., assignor to Westinghouse Electric Corporation, East Pittsburgh, Pa., a corporation of Pennsylvania Application February 25, 1948, Serial No. 10,851

4 Claims. (Cl. 138—38)

This invention relates to fluid pressure apparatus, and more particularly to fluid flow distributing means for a gas turbine power plant of the type having a compressor, combustion apparatus and a turbine operative by motive fluid supplied thereby for driving the compressor.

In order to insure maximum efficiency in operation of a gas turbine engine, particularly the high-speed type designed for propulsion of aircraft, it is important that constant and uniformly distributed flow of air to the combustion apparatus be maintained, not only for support of proper combustion of fuel but also to effect adequate cooling and protection of adjacent elements of the engine. In one well known form of gas turbine engine, a turbine-driven axial-flow compressor is employed to deliver air under pressure to the combustion apparatus by way of an annular passageway including a diffuser portion, in which velocity of the air is decreased and its pressure increased prior to introduction thereof into the combustion zone. Unless the air under pressure thus supplied to the diffuser at high velocity is uniformly distributed, efficiency of the diffuser may be reduced, while uneven distribution in fluid pressure farther on in the region of fuel combustion might promote faulty operation or even lead to early failure of the elements effected.

It is an object of my invention to provide improved flow control structure operable to insure uniform velocity and total pressure distribution of fluid under pressure passing through a passageway.

Another object of the invention is the provision of a fluid flow mixer adapted for association with a compressor discharge diffuser operable to effect substantially uniform radial distribution of fluid under pressure within an annular passageway.

The invention has for a further object the provision of an improved gas turbine apparatus of the type including an axial-flow compressor operative to deliver air under pressure to fuel combustion apparatus by way of an annular passageway, in which is mounted a plurality of radially disposed warped blades arranged in pairs forming offset inlet and outlet communications of substantially constant flow area, so that the outer and inner annuli of moving air will be radially distributed and mixed to insure uniformity of pressure throughout the flow area of the passageway.

Still another object of the invention is to provide flow mixer means for apparatus of the above type comprising a plurality of airfoil blades suitably warped to insure uniform velocity and pressure distribution in an air stream without appreciable pressure drop.

These and other objects are effected by the invention as will be apparent from the following description and claims taken in connection with the accompanying drawings, forming a part of this application, in which:

Fig. 1 is an elevational view partly in section, of a gas turbine power plant embodying a preferred form of the invention;

Fig. 2 is an enlarged detail sectional view of a portion of the apparatus shown in Fig. 1, illustrating one of the mixer blades in side elevation;

Figure 9:
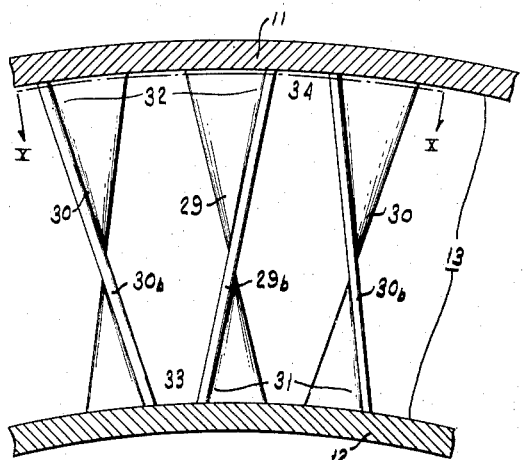
Figure 10:
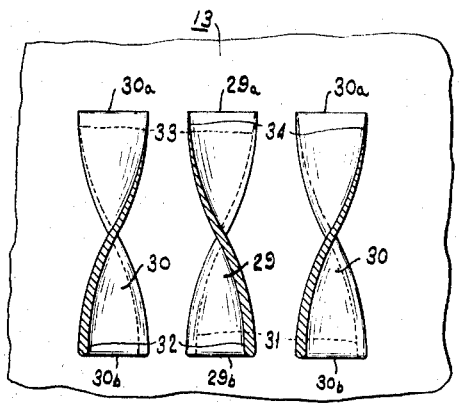
Figure 11:
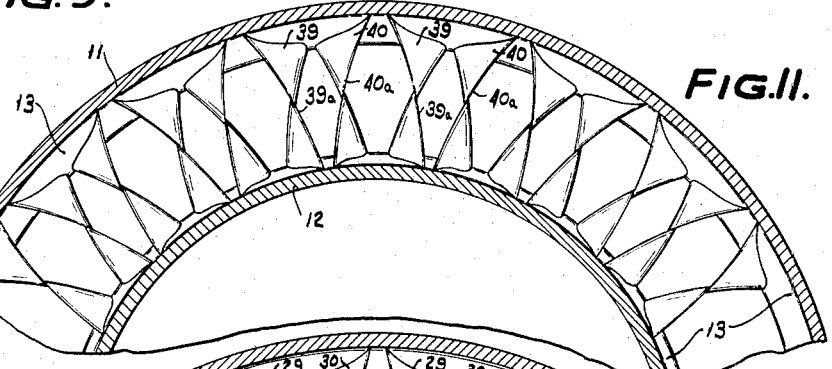
Figure 8:
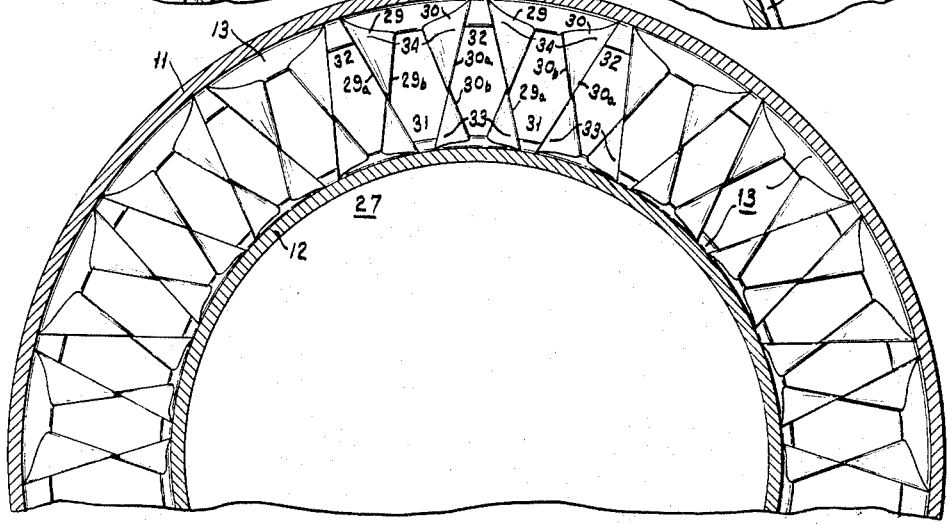

Figs. 3 to 7, inclusive, are sectional views of the mixer blade shown in Fig. 2, taken substantially along the lines III—III, IV—IV, V—V, VI—VI and VII—VII, respectively;

Fig. 8 is a fragmentary sectional view in enlarged detail taken substantially along the line VIII—VIII of Fig. 1;

Fig. 9 is an enlarged detail, fragmentary sectional view taken substantially along the line IX—IX of Fig. 1;

Fig. 10 is a fragmentary, sectional view taken substantially along the line X—X of Fig. 9; and Fig. 11 is a sectional view of a gas turbine engine similar to that illustrated in Fig. 8, but embodying the invention in a different form.

Referring to Fig. 1 of the drawings, the gas turbine engine therein illustrated in schematic form is one of the type for which my invention is particularly well adapted, and comprises a streamlined cylindrical outer casing structure 11 adapted to be mounted in or on the fuselage of an aircraft, for compactly housing operating elements which are constructed and arranged in line to present minimum drag during operation at high speed. Supported within the casing structure 11 is an inner casing structure 12 forming an annular passageway 13, which provides a flow communication that extends longitudinally through the engine from a forwardly directed air intake opening 14 to a rearwardly disposed jet or discharge nozzle 15. Mounted in the casing structure 11—12 along the axis thereof are a fairing section 16 which may contain auxiliary control apparatus (not shown), a multiple stage axial-flow compressor 17, fuel combustion apparatus 19 including an annular combustor or basket structure 20, and a turbine 21. The turbine 21 is operatively connected to the rotor of the compressor 17 by means of an axially mounted shaft 22 which is suitably journaled within the casing structure 12. Mounted within the passageway 13 at the discharge side of the compressor 17 are one or more stages of stationary blading 24, which are disposed somewhat in advance of an enlarged portion of the annular passageway constituting a diffuser portion 25.

In operation, air entering the intake opening 14 is compressed by the compressor 17 and supplied past the stationary blading 24 and through the diffuser 25 to the combustion apparatus 19—20, to support combustion of fuel therein while also blanketing and protecting adjacent surfaces of the power plant from the resulting high temperatures. Hot motive fluid issuing from the combustion apparatus 19—20 is then expanded through the turbine 21 and finally discharged through the nozzle 15 in the form of a jet establishing a propulsion thrust.

In flowing from the portion of passageway 13 containing the blading 24 and through the diffuser portion 25, air under pressure delivered by the compressor should become uniformly distributed throughout the flow area, with a substantial reduction in velocity accompanied by a corresponding increase in pressure. According to the invention, the desired uniformity of velocity and total pressure distribution throughout the flow area are insured by provision of an annular mixer structure 27 comprising a plurality of radially disposed stationary guide vanes or plates 29 and 30, each of which may be suitably mounted within the passageway 13 by means of welding, or by fitting terminal tenon portions (not shown) into corresponding mortise cavities formed in the respective casing walls 11 and 12. These vanes are preferably disposed substantially intermediate the stator blading 24 of the compressor and the diffuser portion 25, as indicated in Fig. 1 of the drawings, but may if desired be located substantially within the diffuser portion in order to conserve space. Each of the vanes 29 and 30 is warped to provide spiral or helical surfaces terminating in trailing and leading edges "a" and "b," respectively, and is preferably formed of airfoil section, as shown in Figs. 3 to 7, inclusive.

Referring to Fig. 8 of the drawings, in which the apparatus is viewed in an upstream direction, it will be seen that these guide vanes 29 and 30 are mounted in pairs, the respective vanes of each pair being oppositely warped or twisted to form complementary helical surfaces. Thus the annular passageway 13 is divided into radially offset, substantially triangular or V-shaped inlet communications including inner and outer entrances 31 and 32, respectively. Similarly, outlet communications including inner and outer exits 33 and 34, respectively, are formed by the complementary vanes 29 and 30. In the form of the invention illustrated in Fig. 8, the respective vanes 29 and 30 are provided with substantially straight trailing edges 29a and 30a. Somewhat thicker straight leading edges 29b and 30b are also formed on these vanes, as shown in Fig. 9 of the drawings. In Fig. 10 the vanes 29 and 30 are viewed from an angle illustrating the axial relationship of the respective pairs of communications, inlet and outlet communications 31 and 34, and 32 and 33, into which the passageway 13 is divided by the fluid mixer structure.

When the axial-flow compressor 17 is driven to deliver air under pressure to the passage 13, an annulus of air discharged from the tips of the usual rotating compressor blades is apt to have a pressure and velocity somewhat in excess of that of an annulus nearer the root portions of the blades. After emerging from the stator blading 24, however, air under pressure flowing from the compressor by way of passageway 13 passes through the inner entrances 31 and communicating outer exits 34, and through the alternate outer entrances 32 and communicating inner exits 33, and thence flows into the diffuser portion 25. Thus such air is divided into different flow paths that are radially offset with respect to one another, so that the pressure and velocity characteristics thereof will be rendered substantially uniform when the air under pressure flows through the diffuser on its way to the combustion apparatus, as already explained.

Referring to Fig. 11, which is an upstream view substantially like that in Fig. 8, vanes 39 and 40 having arcuate trailing edges 39a and 40a and corresponding arcuate leading edges may be provided, if it is desired to warp or form the surfaces thereof for more accurately ensuring uniform flow areas between the vanes. Operation of these vanes to effect the desired uniform radial flow distribution of fluid under pressure will be readily understood from the foregoing description of the form illustrated in Fig. 1 et seq.

It will now be apparent that a flow mixer structure embodying features of my invention may be utilized to advantage in gas turbine power plants of existing design, as well as in engines embodying newer developments. The mixer structure can be expected, under most service conditions, to produce more efficient distribution of motive fluid than that effected by ordinary screen systems, which must be individually designed to meet particular velocity and pressure conditions encountered in different engines.

While the invention has been shown in several forms, it will be obvious to those skilled in the art that it is not so limited, but is susceptible of various other changes and modifications without departing from the spirit thereof.

What is claimed is:

1. In a cylindrical casing structure having an annular passageway, means for supplying fluid under pressure thereto, and stationary flow control means interposed in said passageway comprising nozzle vanes arranged in pairs having opposite helical surfaces co-acting to provide flow distributing passages having walls alternately converging and diverging radially, whereby concentric currents of fluid under pressure flowing through said passageway are radially interchanged and mixed to render uniform the flow of fluid.

2. In fluid translating apparatus casing structure having an annular fluid flow passageway, mixer structure comprising a plurality of radially disposed vanes curved to provide surfaces for guiding axial currents of fluid uniformly throughout the flow area of said passageway, said vanes being arranged in oppositely warped pairs having complementary adjacent surfaces, the adjacent surfaces being arranged to define radially offset communicating inlet and outlet passages having substantially constant flow areas, whereby concentric currents of fluid under pressure flowing through said passageway are mixed during passage through said mixer structure.

3. In a cylindrical casing structure having an annular passageway, the combination therewith of mixer structure interposed in said passageway comprising a plurality of radial vanes arranged in pairs having opposite helical surfaces forming radially offset inlet and outlet passages, said passages being adapted to effect interchange and mixture of currents of fluid under pressure flowing through said passageway.

4. In a casing structure having an annular fluid passageway, blading structure interposed in said passageway comprising a plurality of helical vanes arranged radially in oppositely warped pairs, the edges of adjacent vanes defining substantially V-shaped entrances and radially offset substantially V-shaped exits, respectively, said vanes being adapted to effect substantially uniform velocity and total pressure distribution of fluid under pressure flowing through said passageway.

ARNOLD H. REDDING.

REFERENCES CITED

The following references are of record in the file of this patent:

UNITED STATES PATENTS

| Number | Name | Date |
|---|---|---|
| 483,018 | Schaaf | Sept. 20, 1892 |
| 1,852,380 | Tabor et al. | Apr. 5, 1932 |
| 2,132,854 | Knott | Oct. 11, 1938 |
| 2,343,560 | Kelin et al. | June 10, 1941 |
| 2,400,161 | Mockridge | May 14, 1946 |
| 2,405,723 | Way | Aug. 13, 1946 |